United States Patent
Yang et al.

(10) Patent No.: US 9,655,015 B2
(45) Date of Patent: May 16, 2017

(54) CELL SELECTION METHOD FOR CIRCUIT-SWITCHED FALLBACK CALLS

(71) Applicant: QUALCOMM Incorporated, San Diego, CA (US)

(72) Inventors: Ming Yang, San Diego, CA (US); Tom Chin, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 175 days.

(21) Appl. No.: 14/738,570

(22) Filed: Jun. 12, 2015

(65) Prior Publication Data
US 2016/0366622 A1    Dec. 15, 2016

(51) Int. Cl.
| | | |
|---|---|---|
| *H04W 36/00* | (2009.01) | |
| *H04L 12/26* | (2006.01) | |
| *H04L 12/851* | (2013.01) | |
| *H04W 8/00* | (2009.01) | |
| *H04W 88/02* | (2009.01) | |
| *H04W 36/30* | (2009.01) | |
| *H04W 36/36* | (2009.01) | |

(52) U.S. Cl.
CPC ......... *H04W 36/0083* (2013.01); *H04L 43/08* (2013.01); *H04L 47/24* (2013.01); *H04W 8/005* (2013.01); *H04W 36/0022* (2013.01); *H04W 36/30* (2013.01); *H04W 36/36* (2013.01); *H04W 88/02* (2013.01)

(58) Field of Classification Search
None
See application file for complete search history.

(56) References Cited

U.S. PATENT DOCUMENTS

| | | |
|---|---|---|
| 2008/0102834 A1 | 5/2008 | Bernhard et al. |
| 2012/0302239 A1 | 11/2012 | Hu et al. |
| 2014/0113636 A1* | 4/2014 | Lee ............... H04W 36/00 455/437 |
| 2014/0161020 A1 | 6/2014 | Jung et al. |
| 2014/0228029 A1 | 8/2014 | Wen |

FOREIGN PATENT DOCUMENTS

| | | |
|---|---|---|
| CN | 102137461 A | 7/2011 |
| WO | 2013019288 A1 | 2/2013 |
| WO | WO 2013/019288 A1 * | 2/2013 ............ H04W 48/18 |

OTHER PUBLICATIONS

Ericsson, "Text Proposal for Study on Enhanced Broadcast of System Information"; 3GPP TSG RAN WG #2 84, San Francisco, USA, Nov. 11-15, 2013 (Publicly Available Nov. 2, 2013), R2-134186.*

(Continued)

*Primary Examiner* — Joseph Bednash
(74) *Attorney, Agent, or Firm* — Seyfarth Shaw LLP

(57) ABSTRACT

A method at a user equipment (UE) includes measuring a signal quality of each cell detected from a plurality of frequencies included in a connection release message from a radio access technology (RAT). The measuring may occur during a long-period SIB collection for a previously determined target cell. The method also includes determining a new target cell in place of a previously determined target cell based at least in part on a signal quality of each cell measured during the long-period SIB collection for the previously determined target cell.

24 Claims, 10 Drawing Sheets

(56) References Cited

OTHER PUBLICATIONS

Ericsson: "Text Proposal for Study on Enhanced Broadcast of System Information", 3GPP Draft, R2-134186, RAN WG2 #84, San Francisco, USA, 20131111-20131115, 3rd Generation Partnership Project (3GPP) Nov. 13, 2013 (Nov. 13, 2013), 4 Pages, XP050736942, Mobile Competence Centre, 650, Route Des Lucioles; F-06921 Sophia-Antipolis Cedex, France, Retrieved from the Internet: URL: http://www.3gpp.org/ftp/Meetings_3GPP_SYNC/RAN/RAN2/Docs/ [retrieved on Nov. 13, 2013] the whole document.

International Search Report and Written Opinion—PCT/US2016/036348—ISA/EPO—Sep. 28, 2016.

* cited by examiner

CELL SELECTION METHOD FOR CIRCUIT-SWITCHED FALLBACK CALLS

BACKGROUND

Field

Aspects of the present disclosure relate generally to wireless communication systems, and more particularly, to cell selection for circuit-switched fallback (CSFB) calls.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is long term evolution (LTE). LTE is a set of enhancements to the universal mobile telecommunications system (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the present disclosure, a method of wireless communication is presented. The method includes measuring, for a circuit-switched fallback (CSFB) service from a first RAT to a second RAT, a signal quality of each cell detected from a plurality of frequencies included in a connection release message from the first RAT. The measuring may occur during a long-period SIB collection for a previously determined target cell. The method also includes determining a new target cell in place of a previously determined target cell based at least in part on a signal quality of each cell measured during the long-period SIB collection for the previously determined target cell.

In another aspect of the present disclosure, an apparatus for wireless communication is presented. The apparatus includes means for measuring, for a circuit-switched fallback (CSFB) service from a first RAT to a second RAT, a signal quality of each cell detected from a plurality of frequencies included in a connection release message from the first RAT. The measuring may occur during a long-period SIB collection for a previously determined target cell. The apparatus also includes means for determining a new target cell in place of a previously determined target cell based at least in part on a signal quality of each cell measured during the long-period SIB collection for the previously determined target cell.

In yet another aspect of the present disclosure, an apparatus for wireless communication is presented. The apparatus includes a memory and at least one processor coupled to the memory. The processor(s) is configured to measure, for a circuit-switched fallback (CSFB) service from a first RAT to a second RAT, a signal quality of each cell detected from a plurality of frequencies included in a connection release message from the first RAT. The measuring may occur during a long-period SIB collection for a previously determined target cell. The processor(s) is configured to determine a new target cell in place of a previously determined target cell based at least in part on a signal quality of each cell measured during the long-period SIB collection for the previously determined target cell.

In still another aspect of the present disclosure, a computer program product for wireless communication is presented. The computer program product includes a non-transitory computer-readable medium having encoded thereon program code. The program code includes program code to measure, for a circuit-switched fallback (CSFB) service from a first RAT to a second RAT, a signal quality of each cell detected from a plurality of frequencies included in a connection release message from the first RAT. The measuring may occur during a long-period SIB collection for a previously determined target cell. The program code also includes program code to determine a new target cell in place of a previously determined target cell based at least in part on a signal quality of each cell measured during the long-period SIB collection for the previously determined target cell.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
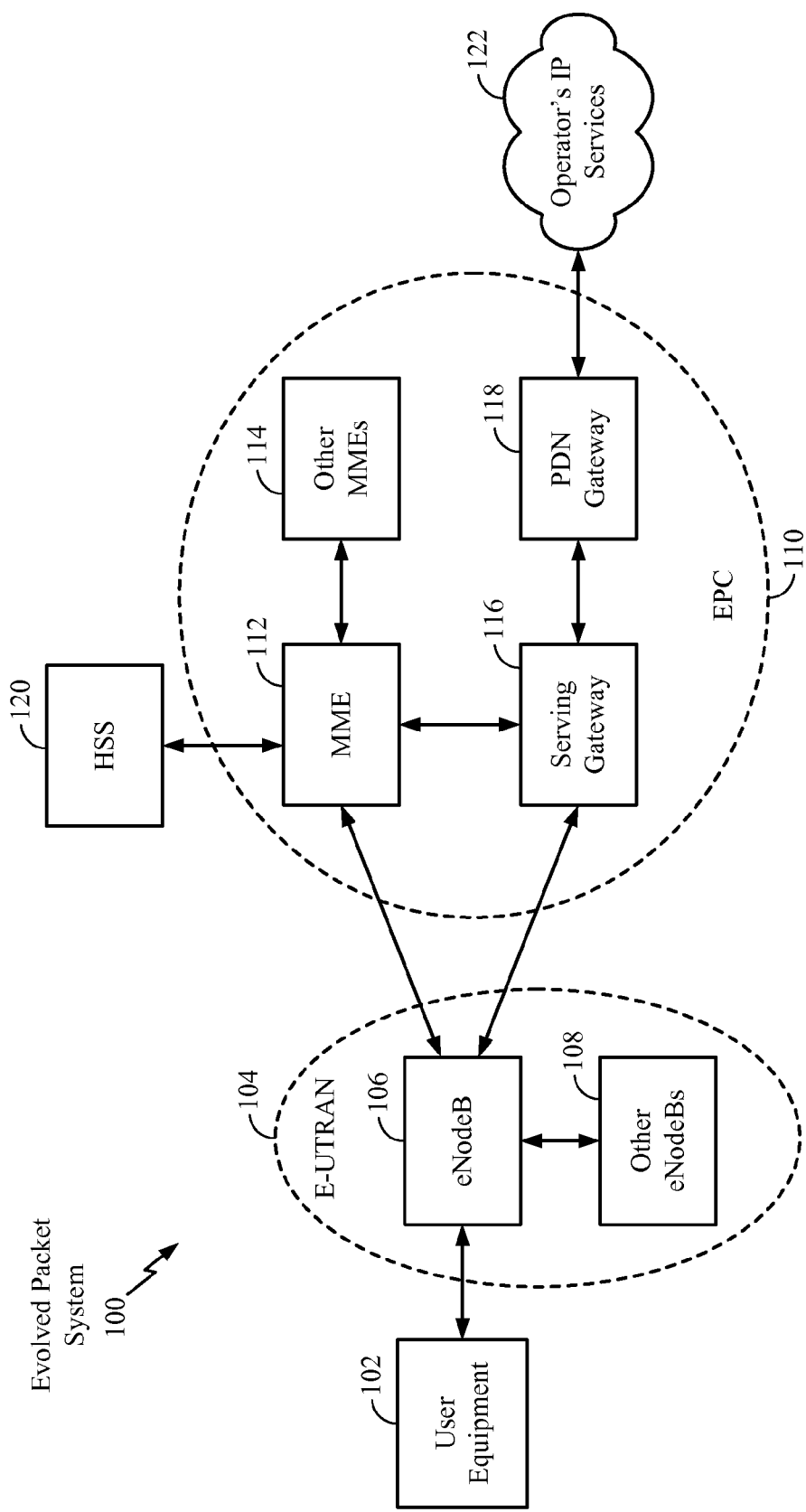
FIG. 1 is a block diagram conceptually illustrating an example of a telecommunications system.

FIG. 1 is a diagram illustrating an LTE network architecture 100. The LTE network architecture 100 may be referred to as an evolved packet system (EPS) 100. The EPS 100 may include one or more user equipment (UE) 102, an evolved UMTS terrestrial radio access network (E-UTRAN) 104, an evolved packet core (EPC) 110, a home subscriber server (HSS) 120, and an operator's IP services 122. The EPS can interconnect with other access networks, but for simplicity those entities/interfaces are not shown. As shown, the EPS 100 provides packet-switched services, however, as those skilled in the art will readily appreciate, the various concepts presented throughout this disclosure may be extended to networks providing circuit-switched services.

The E-UTRAN 104 includes an evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a mobility management entity (MME) 112, other MMEs 114, a serving gateway 116, and a packet data network (PDN) gateway 118. The MME 112 is the control node that processes the signaling between the UE 102 and the EPC 110. Generally, the MME 112 provides bearer and connection management. All user IP packets are transferred through the serving gateway 116, which itself is connected to the PDN gateway 118. The PDN gateway 118 provides UE IP address allocation as well as other functions. The PDN gateway 118 is connected to the operator's IP services 122. The operator's IP services 122 may include the Internet, the Intranet, an IP multimedia subsystem (IMS), and a PS streaming service (PSS).

Figure 2A:
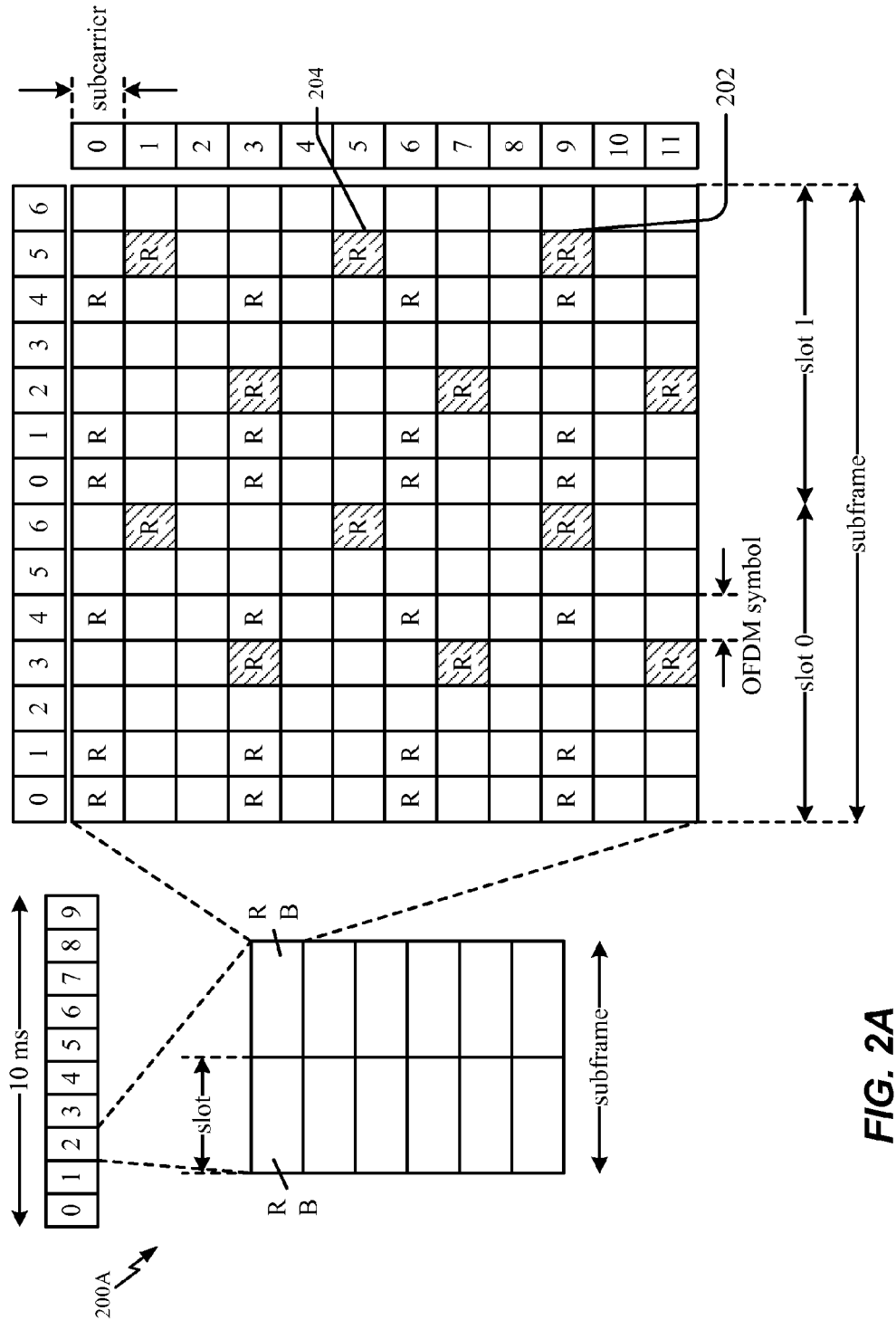
FIG. 2A is a diagram illustrating an example of a downlink frame structure in LTE.

FIG. 2A is a diagram 200A illustrating an example of a downlink frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, for a total of 84 resource elements. For an extended cyclic prefix, a resource block contains 6 consecutive OFDM symbols in the time domain, resulting in 72 resource elements. Some of the resource elements, as indicated as R 202, 204, include downlink reference signals (DL-RS). The DL-RS include Cell-specific RS (CRS) (also sometimes called common RS) 202 and UE-specific RS (UE-RS) 204. UE-RS 204 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 2B:
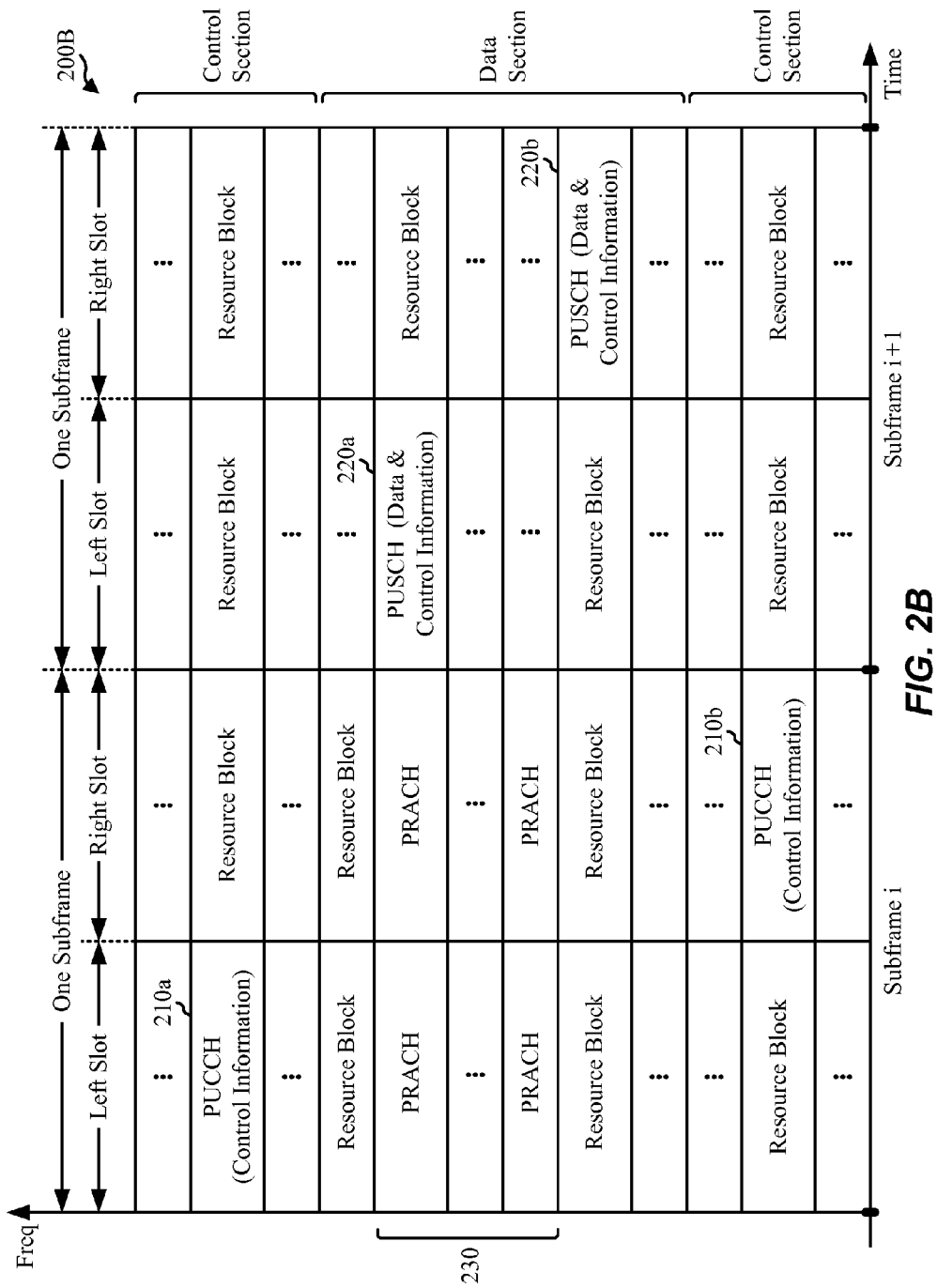
FIG. 2B is a diagram illustrating an example of an uplink frame structure in LTE.

FIG. 2B is a diagram 200B illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 210a, 210b in the control section to transmit control information to an eNodeB. The UE may also be assigned resource blocks 220a, 220b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 230. The PRACH 230 carries a random sequence. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 3:
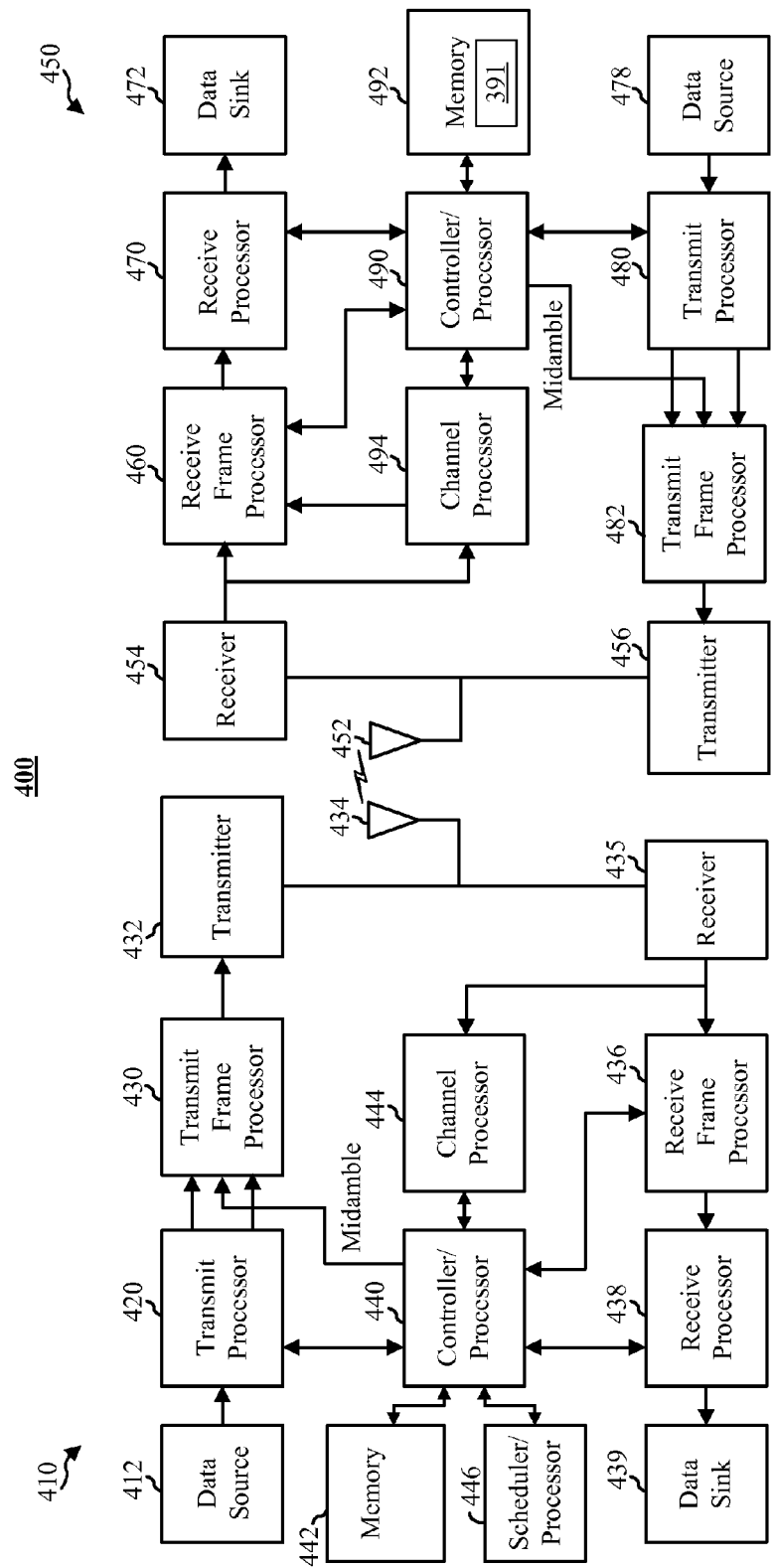
FIG. 3 is a block diagram conceptually illustrating an example of an eNodeB in communication with a UE in a telecommunications system.

FIG. 3 is a block diagram of an eNodeB 310 in communication with a UE 350 in a RAN 300. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the eNodeB 310. More specifically, the receive processor 370 descrambles and despreads the symbols, and then determines the most likely signal constellation points transmitted by the eNodeB 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receive processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the eNodeB 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the eNodeB 310 or from feedback contained in the midamble transmitted by the eNodeB 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the eNodeB 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames. Additionally, a scheduler/processor 346 at the eNodeB 310 may be used to allocate resources to the UEs and schedule downlink and/or uplink transmissions for the UEs.

The controller/processors 340 and 390 may be used to direct the operation at the eNodeB 310 and the UE 350, respectively. For example, the controller/processors 340 and 390 may provide various functions including timing, peripheral interfaces, voltage regulation, power management, and other control functions. The computer-readable media of memories 342 and 392 may store data and software for the eNodeB 310 and the UE 350, respectively. For example, the memory 392 of the UE 350 may store a cell selection module 391, which, when executed by the controller/processor 390, configures the UE 350 for selecting a cell for circuit-switched fall back (CSFB) calls.

Figure 4:
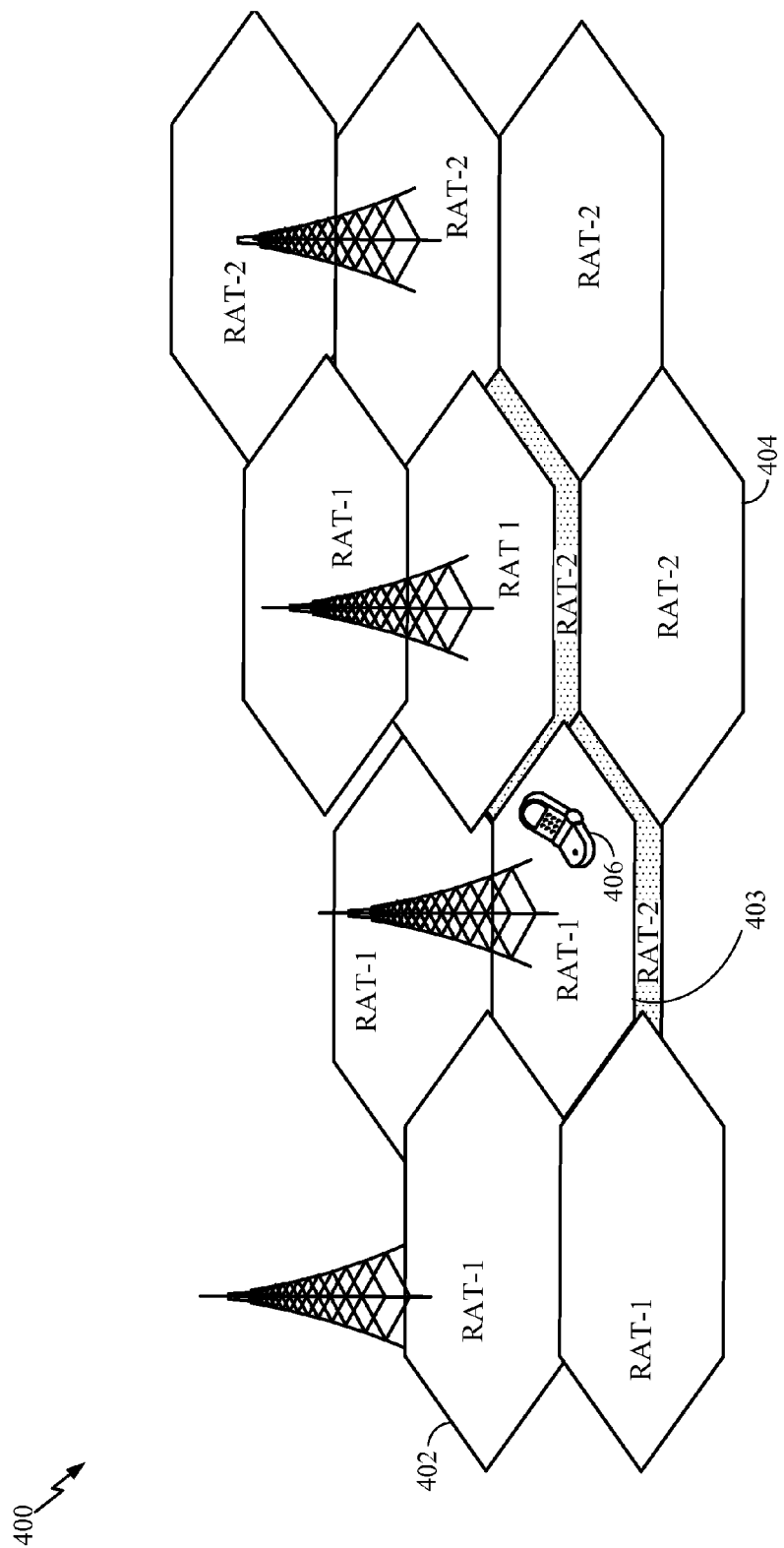
FIG. 4 illustrates network coverage areas including a first radio access technology (RAT) network and a second RAT network according to aspects of the present disclosure.

FIG. 4 illustrates sample network coverage areas according to aspects of the present disclosure. Some networks, such as a newly deployed network, may cover only a portion of a geographical area. Another network, such as an older more established network, may better cover the area, including remaining portions of the geographical area. FIG. 4 illustrates coverage of a newly deployed network utilizing a first type of radio access technology (RAT-1), such as an LTE or TD-SCDMA network, etc. FIG. 4 also illustrates a more established network utilizing a second type of radio access technology (RAT-2), such as GSM, or CDMA network, etc.

The geographical area 400 may include RAT-1 cells 402 and 403 and RAT-2 cells 404. In one example, the RAT-1 cells 402 and 403 may not support voice calls. The RAT-2 cell 404, such as a 2G/3G RAT cell (e.g., GSM, TD-SCDMA, etc.), may support circuit-switched fall back (CSFB) calls such as a voice call. However, those skilled in the art will appreciate that other types of radio access technologies may be utilized within the cells. The user equipment (UE) 406 may move from one cell, such as the RAT-1 cell 403, to another cell, such as the other RAT-1 cell 402. The movement of the UE 406 may involve a handover or a cell reselection procedure.

In another example, the UE 406 may trigger a handover by redirecting to a RAT-2 cell such as the RAT-2 cell 404 for a CSFB service such as a voice call. For example, while under the coverage of the serving RAT-1 cell 403, the UE 406 may originate a voice call or receive a mobile terminated call. It so happens that the RAT-1 cell 403 does not support a voice call. Therefore the UE 406 is redirected to a target RAT-2 cell 404 that supports the voice call. A handover or cell reselection may be performed when the UE 406 is redirected to the RAT-2 cell 404.

In one aspect of the present disclosure, before the UE 406 is redirected to the RAT-2 cell 404, the serving RAT-1 cell 403 may send a connection release message. Included in the connection release message may be a list of potential target RAT-2 cells. The UE 406 selects one cell from the list of potential target cells based on a set of criteria include measurements of signal quality made at the UE 406.

A handover or cell reselection may also be performed when there is a coverage hole or lack of coverage in one network or when there is traffic balancing between first RAT and the second RAT networks. As part of that handover or cell reselection process, while in a connected mode with a RAT-1 system (e.g., TD-LTE) a UE may be specified to perform a measurement of a neighboring cell (such as a GSM cell). For example, the UE may measure the neighbor cells of a second network for signal strength, frequency channel, and base station identity code (BSIC). The UE may then connect to the strongest cell of the second network. Such measurement may be referred to as inter radio access technology (IRAT) measurement.

The UE may send a serving cell such as the RAT-1 cell 403 a measurement report indicating results of the IRAT measurement performed by the UE 406. The serving cell may then trigger a handover of the UE 406 to a new cell in the other RAT, such as the RAT-2 cell 404, based on the measurement report. The measurement may include a serving cell signal strength, such as a received signal code power (RSCP) for a pilot channel (e.g., primary common control physical channel (PCCPCH)). The signal strength is compared to a serving system threshold. The serving system threshold can be indicated to the UE through dedicated radio resource control (RRC) signaling from the network. The measurement may also include a neighbor cell received signal strength indicator (RSSI). The neighbor cell signal strength can be compared with a neighbor system threshold. Before handover or cell reselection, in addition to the measurement processes, the base station IDs (e.g., BSICs) are confirmed and re-confirmed.

Selection Method for Circuit-Switched Fall Back Calls

It has been observed, when a UE receives an LTE radio resource control (RRC) release message with a redirection command, the redirection command includes a list of potential frequencies for target cells. For example, with respect to GSM, a list of absolute radio-frequency channel numbers (ARFCNs) is provided. The UE may first perform a scan for all the frequencies, and then rank the frequencies based on the signal strength values (e.g., received signal strength indicator (RSSI) values) above a predetermined threshold, from the strongest to the weakest. The corresponding cell of the strongest frequency is the target cell for the UE.

The UE may then perform synchronization channel (e.g., frequency correction channel (FCCH)/synchronization channel (SCH) in a GSM network) decoding for each frequency on the ranked frequency list. The UE may calculate an arrival time of the broadcast control channel (e.g., BCCH) that carries long-period system information blocks (SIBs) for the strongest frequency, based on the frame number carried in the decoded synchronization channel. The long-period SIBs include information enabling the UE to switch to a circuit-switch RAT for a CSFB call. The information may include a public land mobile network (PLMN) ID, a minimal RSSI level for camping, a barred status, etc.

When time permits, the UE may decode the synchronization channel for the second, third, fourth . . . strongest frequency, until the long-period SIBs for the strongest frequency arrive. Sometimes long-period SIBs for the non-strongest frequencies, such may arrive earlier than the long-period SIBs for the strongest frequency.

The UE may wait a considerable amount of time before the arrival of the long-period SIBs for the strongest frequency. Generally, after the UE collects the long-period SIBs for the strongest frequency, the UE moves into an early camp procedure, and starts to decode specific broadcast channels (e.g., BCCH) for only the strongest frequency. After collecting all SIBs, the UE selects a cell for the CSFB service. However, due to radio frequency variations while the UE waits for the long-period SIBs for the strongest frequency, the UE may end up selecting a weak cell for CSFB call setup, and this in turn may result in a CSFB service failure.

To address the above mentioned issue, after decoding short-period SIBs and before the long-period SIBs for the strongest frequency arrive, the UE may perform power scans periodically. When the signal quality (e.g., RSSI) and signal to noise ratio (SNR)) differences between the just-scanned strongest frequency and non-strongest frequencies are smaller than a predefined threshold, the UE may abort short-period SIB decoding for the strongest frequency. Instead, the UE selects a new strongest frequency based on various factors as the new target cell. This effectively avoids selecting a weak cell for CSFB call setup due to radio frequency variations.

The various factors for selecting the new target cell may include a percentage of long-period SIBs that are already collected during the long-period SIB collection. Other factors may include a signal quality of each cell that is measured, a difference in signal quality between the previously determined target cell and the newly determined target cell, and signal quality trends (e.g., a first trend in variations of the signal quality of the previously determined target cell; a second trend in the signal quality of the new target cell).

Figure 5:
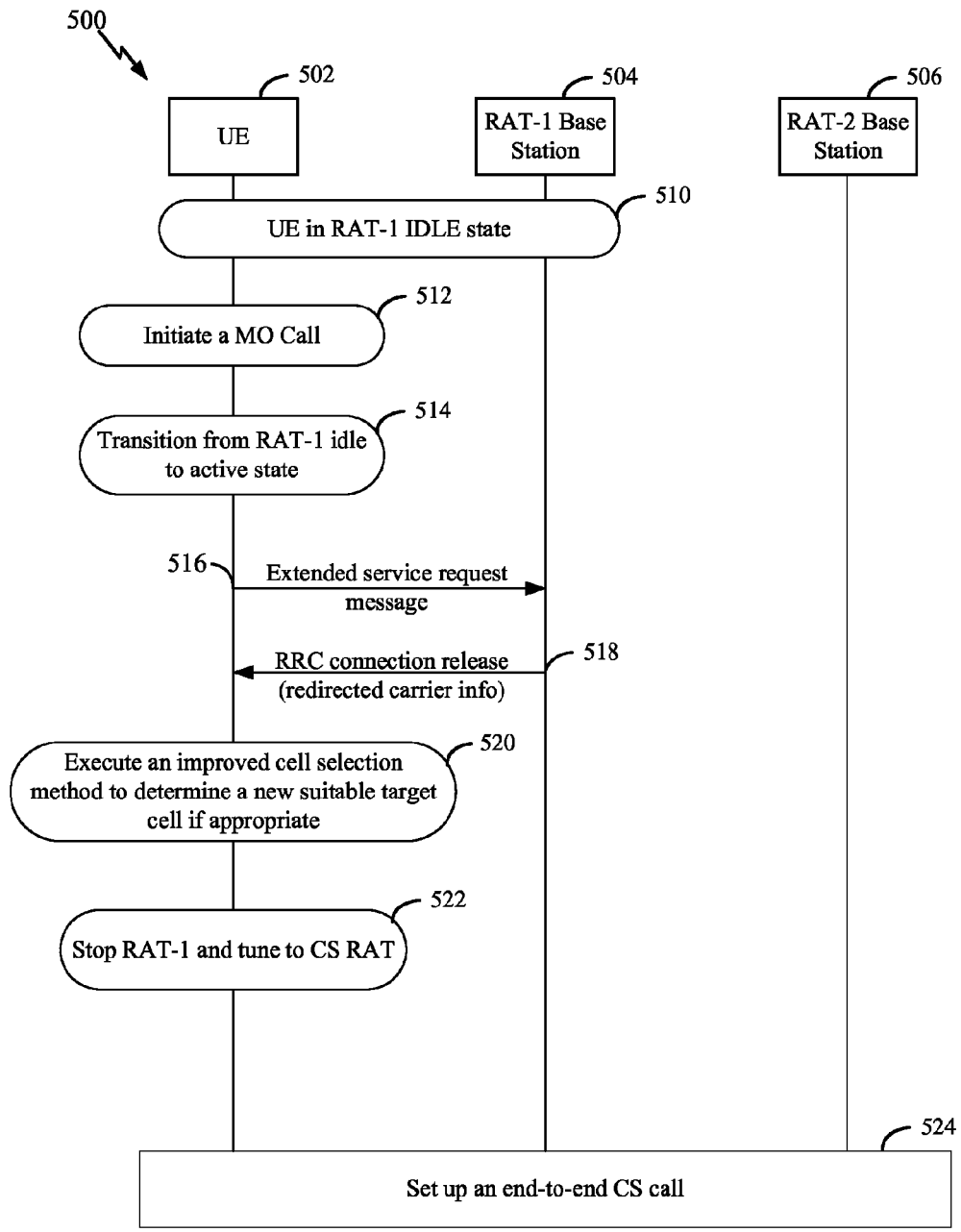
FIG. 5 is a call flow diagram conceptually illustrating an example process of cell selection for circuit-switched fallback (CSFB) calls according to aspects of the present disclosure.

FIG. 5 shows a flow diagram 500 conceptually illustrating an example process for cell selection for circuit-switched fall back calls according to aspects of the present disclosure. The flow diagram 500 illustrates the interactions among a UE 502, a RAT-1 base station 504 and a RAT-2 base station 506. In one aspect, the RAT-1 base station may be an LTE or TD-LTE eNodeB such as the eNodeB 106 of FIG. 1 or the eNodeB 310 of FIG. 3. The RAT-2 base station may be a 2G/3G RAT base station such as a GSM or TD-SCDMA base station.

The UE 502 at time 510 is camped in idle mode on a cell of the RAT-1 base station 504. At time 512, the UE 502 may initiate a mobile originated (MO) voice call and as a result, the UE 502 may transition from the idle state to an active state at time 514. At time 516, the UE 502 sends an extended service request to the current serving base station 504 to request a redirection to a RAT-2 cell to service the mobile originated call the UE 502 just initiated, because the RAT-1 base station 504 does not support voice calls. A CSFB indicator is included in the extended service request message. The redirection service redirects the UE from one RAT to another RAT for a particular service and it is commonly used for services such as load balancing and circuit-switched fallback (CSFB) (among others) from a packet switched only RAT (e.g., LTE) to another RAT that supports circuit-switched services (e.g., GSM or TD-SCDMA).

In this example, at time 518, the UE receives a connection release message, such as radio resource control (RRC) connection release message from the RAT-1 base station 504. Included in the release message is a set of frequencies of RAT-2 from which the UE 502 can select a target cell.

At time 520, the UE 502 may execute an improved cell selection method for CSFB calls to select a target cell without an extended delay while reducing the risk of selecting a weak cell due to radio frequency (RF) variation. Details of the improved cell selection method are provided below.

At time 522, the UE 502 may stop the first RAT, including stopping receiving information from the base station 504 and tune to the selected target cell of the second RAT. Once the UE 502 switches to the selected target cell, the UE 502 proceeds to setting up an end-to-end circuit-switched call at time 524.

Figure 6A:
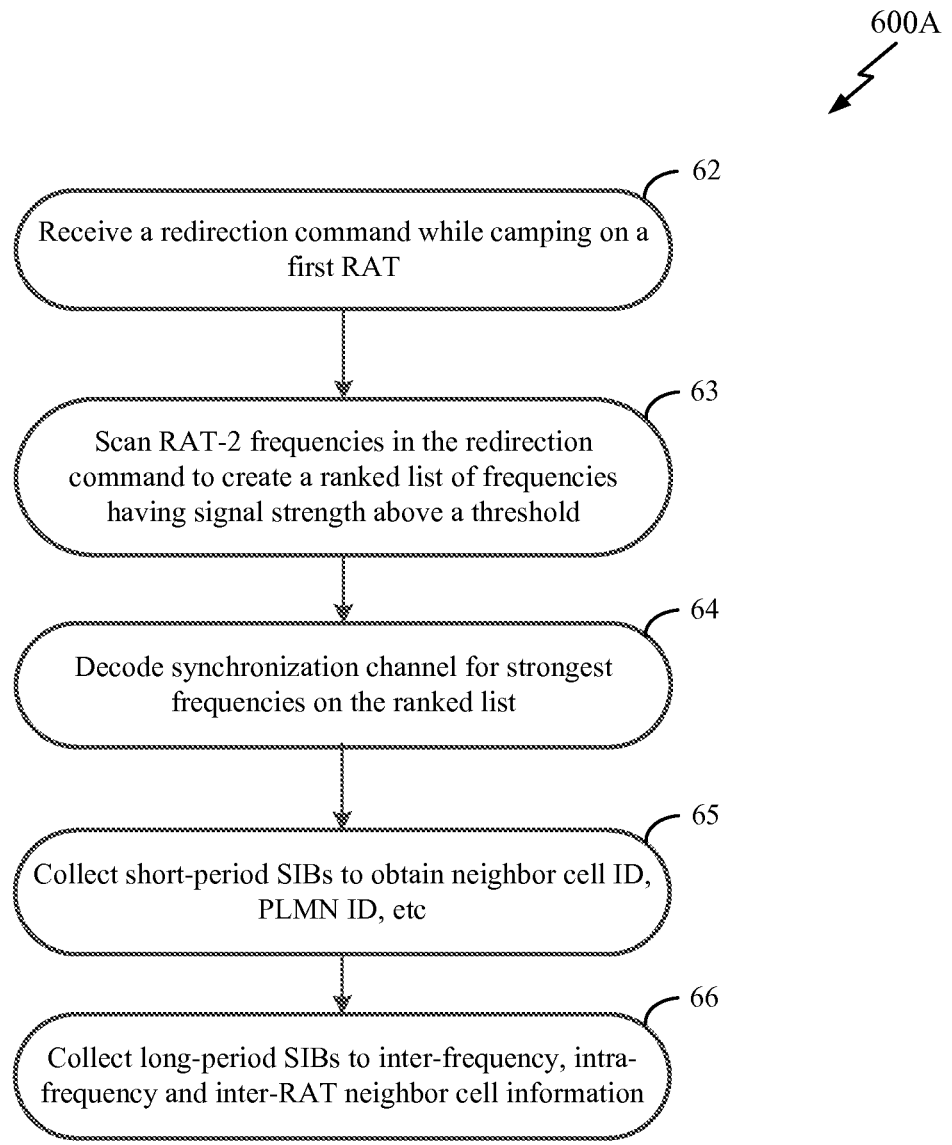
FIG. 6A is a flow diagram obtaining information for performing an inter-RAT cell reselection or handover.

FIG. 6A is a flow diagram for obtaining information to perform an inter-RAT cell reselection or handover from a first RAT cell to a second RAT cell. At block 62, the UE may receive a redirection command while camping on a first RAT cell, such as an LTE cell, such as the eNodeB 504 of FIG. 5. This may happen when the UE initiates a mobile originated voice call or receives a mobile terminated voice call.

In this example, the LTE network upon which the UE is camping does not support voice calls, and thus the network may have to redirect the UE to a circuit-switched capable RAT, such as a GSM cell or a TD-SCDMA cell, for providing the voice call service. In one aspect of the present disclosure, the redirection command is included in a connection release message such as a radio resource control (RRC) connection release message. Also included in the connection release message is a list of potential second RAT frequencies for selecting a target cell to switch to for the CSFB call.

At block 63, the UE may scan all of the second RAT frequencies on the frequency list included in the redirection command and create a ranked frequency list. The UE ranks the frequencies, whose measured signal qualities are above a predetermined threshold, from strongest to weakest. The UE may then rank the frequencies or update a ranked frequency list, based on measured signal qualities which include one or more of the following: received signal strength indicator (RSSI), received signal code power (RSCP), reference signal received power (RSRP), reference signal received quality (RSRQ), received signal strength indicator (RSSI), signal to noise ratio (SNR), and signal to interference plus noise ratio (SINR). In one aspect of the present disclosure, a cell corresponding to the strongest frequency on the ranked frequency list may be selected as target cell for the UE to switch to for the CSFB call.

In one example, the redirection command the UE receives in the LTE RRC connection release message includes a list of GSM absolute radio-frequency channel numbers (ARFCNs). In this GSM example, the UE performs a power scan for all the GSM ARFCNs. The UE then ranks the GSM ARFCNs based on RSSI (received signal strength indicator) values for each RSSI that is above a predetermined threshold and determines a strongest GSM ARFCN.

At block 64, the UE may decode synchronization channels for cells corresponding to the strongest frequencies on the ranked frequency list. Examples of the synchronization channels are the GSM frequency correction channel (FCCH) and synchronization channel (SCH) carried in certain broadcast control channel (BCCH) time slots. After collecting and decoding the synchronization channels, the SIB arrival times for the cell become known to the UE.

At block 65, the UE may collect and decode the short-period SIBs and obtain information such as public land mobile network (PLMN) ID, neighbor cell IDs and registration area IDs. The short-period SIBs are collected for several of the strongest cells.

At block 66, the UE may collect and decode the long-period SIBs and obtain random access channel (RACH) related information for reselection or handover to the selected target cell of the second RAT. The long-period SIB messages provide specific information about inter-RAT reselection, which the UE uses to perform reselection or handover from the current serving LTE cell to the selected target GSM cell, in one example of the present disclosure. The long-period SIBs are generally collected for only the strongest cell. More detail of long-period SIB collection is provided with respect to FIG. 6B.

Some of the system information messages are termed long-period SIBs because they have a longer repeating period and thus may take longer to receive or decode. In contrast, other SIBs may be termed short-period SIBs because they have a shorter repeating period and thus may take a shorter amount of time to receive or decode.

Figure 6B:
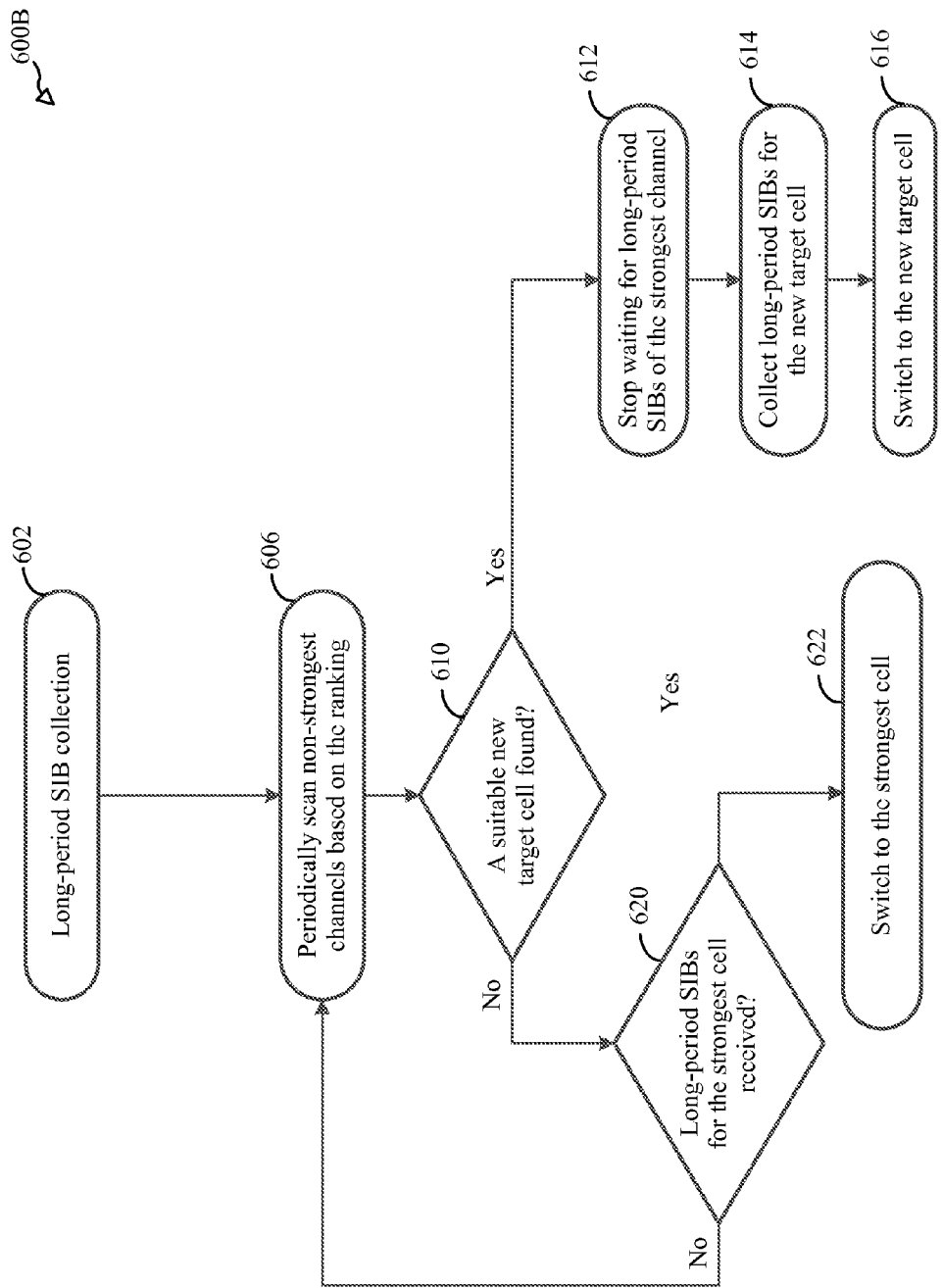
FIG. 6B is a flow diagram illustrating an example decision process for cell selection for CSFB calls according to aspects of the present disclosure.

FIG. 6B shows a flow diagram 600B illustrating, as an example, a decision process at a UE for long-period SIB collection according to aspects of the present disclosure. The flow diagram 600B is for illustration purposes only and other alternative aspects of the decision process for the cell selection are certainly possible.

At block 602, long-period SIB collection begins for the strongest cell. At block 606, the UE may periodically scan and measure non-strongest frequencies on the ranked frequency list while waiting for the arrival of the long-period SIB messages for the strongest frequency. In one aspect, the UE may update the previously ranked frequency list based on the most recent results of scanning and measurements.

At block 610, the UE determines whether a better target cell is found. The UE may select a new target cell to switch to in place of the previously determined target cell, based on a variety of factors. The factors may include signal quality difference between the previous target cell and new target cell, the signal quality trends of both the previous target cell and the new target cell, and a proportion of the long-period SIB messages that have already been received and decoded, among other factors. For example, if the original target cell becomes weak while another cell becomes stronger, a better target cell is found.

If a suitable new target cell is found, at block 612, the UE aborts waiting for the long-period SIBs for the previous target cell and instead collects the long-period SIBs for the new target cell, at block 614. Furthermore, at block 616, once all preparation is completed, the UE switches to the new target cell through a reselection or handover procedure as illustrated in FIG. 5.

However, if a suitable new target cell is not found, at block 610, the UE may check to determine if the long-period SIBs for the strongest cell have arrived at block 620. If the long-period SIBs for the strongest cell have arrived (620: YES), the UE at block 622 switches to the previously determined strongest cell. Otherwise (620: NO), the process returns to block 606 and continues scanning and measuring the non-strongest frequencies on the ranked frequency list while waiting for the long-period SIBs for the strongest cell.

Figure 7:
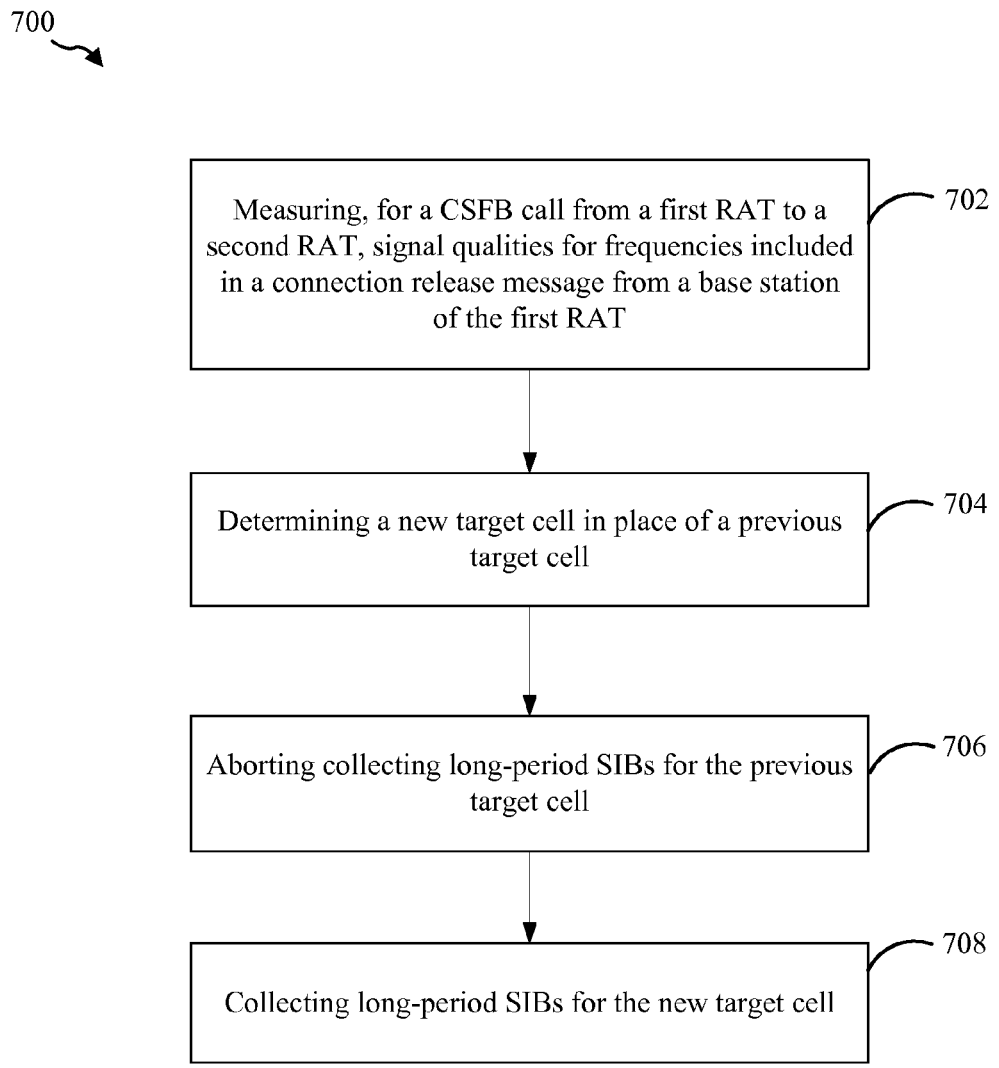
FIG. 7 is a flow diagram illustrating a method for cell selection for CSFB calls at a UE according to aspects of the present disclosure.

FIG. 7 is a flow diagram illustrating a method 700 for cell selection for CSFB calls at a UE according to aspects of the present disclosure. At block 702, the UE measures, for a circuit-switched fallback (CSFB) service from a first RAT to a second RAT, a signal quality for each frequency included in a connection release message. The UE measures the signal quality of the frequencies on a ranked frequency list while waiting to collect long-period SIBs for a previously determined target cell.

At block 704, the UE determines a new target cell in place of a previous target cell, based on the signal quality of the new target cell as measured during the long-period SIB collection for the previously determined target cell. If the signal quality of the just scanned cell meets a signal quality criterion or a threshold for reselection, the cell can be a potential new target cell. A final determination of the new target cell may be based on a combination of factors, as described.

In one aspect, the UE at block 704 may determine the new target cell based on a percentage of long-period SIBs already collected during the long-period SIB collection for the strongest cell. As described earlier, the UE may periodically scan the non-strongest frequencies on the ranked frequency list to determine whether to receive long-period SIBs for the non-strongest frequencies on the list, while waiting for the arrival of the long-period SIBs for the strongest cell. When the percentage long-period SIBs already collected is high, it may be an indication the UE has waited a considerable amount of time and thus the reselection process is almost complete. Therefore, it is less desirable to switch target cells at this point, which would further delay the process.

In another aspect of the present disclosure, the UE at block 704 may also determine the new target cell based on a difference in signal quality between the previously determined target cell and a potential new target cell. When the difference in signal quality is small, it may mean that the signal quality of the potential target cell is close to that of the previous target cell and it is less likely that the potential target cell be selected as the new target cell.

In another aspect of the present disclosure, the UE at block 704 may also determine the new target cell based on a trend in signal quality of the previously determined target cell and a trend in signal quality of the potential new target cell. If the trend is such that the signal quality of the previous target cell is becoming worse, (i.e., trending downward) and the signal quality of the potential target cell is trending upward, it is more likely that the potential target cell will be selected as the new target cell.

At block 706, the UE aborts collecting the long-period SIBs for the previously determined target cell. Once the new target cell is determined, collecting long-period SIBs for the previous target cell is no longer desired. At block 708, the UE collects the long-period SIBs for the new target cell. This may include collecting at least the SIBs to gather information for inter-RAT reselection.

Figure 8:
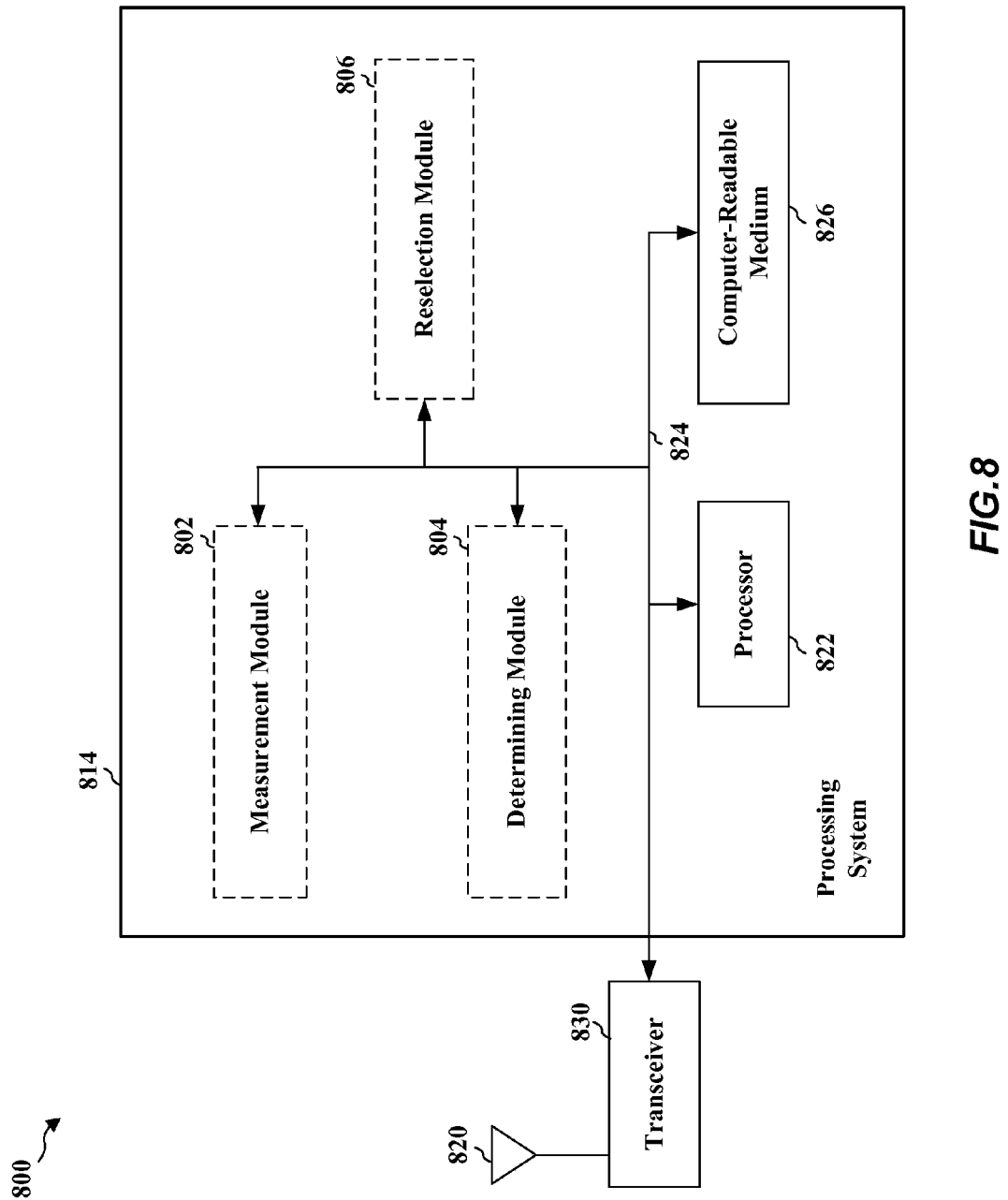
FIG. 8 is a block diagram illustrating different modules/means/components for cell selection for CSFB calls in an example apparatus according to aspects of the present disclosure.

FIG. 8 is a block diagram illustrating an example of a hardware implementation for an apparatus 800 employing a processing system 814 with different modules/means/components for cell selection for CSFB calls in an example apparatus according to one aspect of the present disclosure. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware modules, represented by the processor 822 the modules 802, 804, 806 and the non-transitory computer-readable medium 826. The bus 824 may also link various other circuits such as timing sources, peripherals, voltage regulators, and power management circuits, which are well known in the art, and therefore, will not be described any further.

The apparatus includes a processing system 814 coupled to a transceiver 830. The transceiver 830 is coupled to one or more antennas 820. The transceiver 830 enables communicating with various other apparatus over a transmission medium. The processing system 814 includes a processor 822 coupled to a non-transitory computer-readable medium 826. The processor 822 is responsible for general processing, including the execution of software stored on the computer-readable medium 826. The software, when executed by the processor 822, causes the processing system 814 to perform the various functions described for any particular apparatus. The computer-readable medium 826 may also be used for storing data that is manipulated by the processor 822 when executing software.

The processing system 814 includes a measurement module 802 for measuring signal qualities of cells included in a release message received at the UE. The processing system 814 also includes a determining module 804 for determining a new target cell. The processing system 814 may also include a reselection module for the UE to switch from the current cell to a target cell. The modules 802, 804 and 806 may be software modules running in the processor 822, resident/stored in the computer-readable medium 826, one or more hardware modules coupled to the processor 822, or some combination thereof. The processing system 814 may be a component of the UE 350 of FIG. 3 and may include the memory 392, and/or the controller/processor.

In one configuration, an apparatus such as a UE 350 is configured for wireless communication including means for measuring for a circuit-switched fallback (CSFB) service from a first RAT to a second RAT. In one aspect, the measuring means may be the antennas 352, the receiver 354, the channel processor 394, the receive frame processor 360, the receive processor 370, the controller/processor 390, the memory 392, measurement module 802, and/or the processing system 814 configured to perform the functions recited by the measuring means.

The UE 350 is also configured to include means for determining a new target cell. In one aspect, the determining means may include the controller/processor 390, the memory 392, the determining module 804, and/or the processing system 814 configured to perform the functions recited by the determining means. In one configuration, the means and functions correspond to the aforementioned structures. In another aspect, the aforementioned means may be a module or any apparatus configured to perform the functions recited by the determining means.

The UE 350 is also configured to include means for collecting long-period SIBs for the new target cell and for aborting collecting the long-period SIBs for the pervious target cell. In one aspect, the collecting means may include the antennas 352, the receiver 354, the channel processor 394, the receive frame processor 360, the receive processor 370, the controller/processor 390, the memory 392, the reselection module 806, and/or the processing system 814 configured to perform the functions recited by the collecting means. In one configuration, the means and functions correspond to the aforementioned structures. In another aspect, the aforementioned means may be a module or any apparatus configured to perform the functions recited by the collecting means.

Several aspects of a telecommunications system has been presented with reference to LTE (in FDD, TDD, or both modes), 2G/3G RATs such as GSM, TD-SCDMA and CDMA2000, and evolution-data optimized (EV-DO). As those skilled in the art will readily appreciate, various aspects described throughout this disclosure may be extended to other telecommunication systems, network architectures and communication standards, including those with high throughput and low latency such as 4G systems, 5G systems and beyond. By way of example, various aspects may be extended to other systems such as or LTE-advanced (LTE-A), W-CDMA, high speed downlink packet access (HSDPA), high speed uplink packet access (HSUPA), high speed packet access plus (HSPA+) and TD-CDMA. Various aspects may also be extended to systems employing ultra mobile broadband (UMB), IEEE 802.11 (Wi-Fi), IEEE 802.16 (WiMAX), IEEE 802.20, ultra-wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

It is also to be understood that the term "signal quality" is non-limiting. Signal quality is intended to cover any type of signal metric such as received signal code power (RSCP), reference signal received power (RSRP), reference signal received quality (RSRQ), received signal strength indicator (RSSI), signal to noise ratio (SNR), signal to interference plus noise ratio (SINR), etc.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method at a user equipment (UE) for wireless communications, comprising:
   measuring, for a circuit-switched fallback (CSFB) service from a first RAT to a second RAT, a signal quality of each cell detected from a plurality of frequencies included in a connection release message from the first RAT, the measuring occurring during a long-period SIB (system information block) collection for a previously determined target cell; and
   determining a new target cell in place of the previously determined target cell based at least in part on the signal quality of each cell measured during a long-period SIB collection for the previously determined target cell.

2. The method of claim 1, further comprising determining the new target cell in place of the previously determined target cell based at least in part on a percentage of long-period SIBs that are already collected during the long-period SIB collection.

3. The method of claim 1, further comprising determining the new target cell based at least in part on a difference in the signal quality between the previously determined target cell and the new target cell.

4. The method of claim 1, further comprising determining the new target cell based at least in part on a first trend in variations of the signal quality of the previously determined target cell and a second trend in the signal quality of the new target cell.

5. The method of claim 1, further comprises aborting the long-period SIB collection for the previously determined target cell.

6. The method of claim 1, further comprising collecting long-period SIBs for the new target cell.

7. An apparatus for wireless communication, comprising:
   means for measuring, for a circuit-switched fallback (CSFB) service from a first RAT to a second RAT, a signal quality of each cell detected from a plurality of frequencies included in a connection release message from the first RAT, the measuring occurring during a long-period SIB collection for a previously determined target cell; and
   means for determining a new target cell in place of the previously determined target cell based at least in part on the signal quality of each cell measured during the long-period SIB collection for the previously determined target cell.

8. The apparatus of claim 7, further comprising means for determining the new target cell in place of the previously determined target cell based at least in part on a percentage of long-period SIBs that are already collected during the long-period SIB collection.

9. The apparatus of claim 7, further comprising means for determining the new target cell based at least in part on a difference in the signal quality between the previously determined target cell and the new target cell.

10. The apparatus of claim 7, further comprising means for determining the new target cell based at least in part on a first trend in variations of the signal quality of the previously determined target cell and a second trend in the signal quality of the new target cell.

11. The apparatus of claim 7, further comprises means for aborting the long-period SIB collection for the previously determined target cell.

12. The apparatus of claim 7, further comprising means for collecting long-period SIBs for the new target cell.

13. An apparatus for wireless communication, comprising:
   a memory; and
   at least one processor coupled to the memory, the at least one processor being configured:
      to measure, for a circuit-switched fallback (CSFB) service from a first RAT to a second RAT, a signal quality of each cell detected from a plurality of frequencies included in a connection release message from the first RAT, the measuring occurring during a long-period SIB collection for a previously determined target cell; and
      to determine a new target cell in place of the previously determined target cell based at least in part on the signal quality of each cell measured during the long-period SIB collection for the previously determined target cell.

14. The apparatus of claim 13, in which the at least one processor is further configured to determine the new target cell in place of the previously determined target cell based at least in part on a percentage of long-period SIBs that are already collected during the long-period SIB collection.

15. The apparatus of claim 13, in which the at least one processor is further configured to determine the new target cell based at least in part on a difference in the signal quality between the previously determined target cell and the new target cell.

16. The apparatus of claim 13, in which the at least one processor is further configured to determine the new target cell based at least in part on a first trend in variations of the signal quality of the previously determined target cell and a second trend in the signal quality of the new target cell.

17. The apparatus of claim 13, in which the at least one processor is further configured to abort the long-period SIB collection for the previously determined target cell.

18. The apparatus of claim 13, in which the at least one processor is further configured to collect long-period SIBs for the new target cell.

19. A computer program product for wireless communication in a wireless network, comprising:
   a non-transitory computer-readable medium having non-transitory program code recorded thereon, the program code comprising:
      program code to measure, for a circuit-switched fallback (CSFB) service from a first RAT to a second RAT, a signal quality of each cell detected from a plurality of frequencies included in a connection release message from the first RAT, the measuring occurring during a long-period SIB collection for a previously determined target cell; and
      program code to determine a new target cell in place of the previously determined target cell based at least in part on the signal quality of each cell measured during the long-period SIB collection for the previously determined target cell.

20. The computer program product of claim 19, further comprising: program code to determine the new target cell in place of the previously determined target cell based at least in part on a percentage of long-period SIBs that are already collected during the long-period SIB collection.

21. The computer program product of claim 19, further comprising: program code to determine the new target cell based at least in part on a difference in the signal quality between the previously determined target cell and the new target cell.

22. The computer program product of claim 19, further comprising: program code to determine the new target cell based at least in part on a first trend in variations of the signal quality of the previously determined target cell and a second trend in the signal quality of the new target cell.

23. The computer program product of claim 19, further comprising: program code to abort the long-period SIB collection for the previously determined target cell.

24. The computer program product of claim 19, further comprising: program code to collect long-period SIBs for the new target cell.

* * * * *